(12) United States Patent
Aschir

(10) Patent No.: US 6,961,576 B2
(45) Date of Patent: Nov. 1, 2005

(54) METHOD FOR CAUSING A COMMUNICATION LINK TO BE ESTABLISHED

(75) Inventor: Alexander Aschir, München (DE)

(73) Assignee: Siemens Aktiengesellschaft, Munich (DE)

( * ) Notice: Subject to any disclaimer, the term of this patent is extended or adjusted under 35 U.S.C. 154(b) by 296 days.

(21) Appl. No.: 10/346,182

(22) Filed: Jan. 17, 2003

(65) Prior Publication Data

US 2003/0186682 A1    Oct. 2, 2003

(30) Foreign Application Priority Data

Jan. 21, 2002 (DE) ............................ 102 03 199

(51) Int. Cl.⁷ ...................... H04Q 7/20; H04L 12/51
(52) U.S. Cl. ................. 455/445; 455/466; 455/432; 370/401
(58) Field of Search ..................... 455/414.4, 466, 455/554.1, 445, 432.1–432.3, 414; 370/351–357, 370/401

(56) References Cited

U.S. PATENT DOCUMENTS

| | | | | |
|---|---|---|---|---|
| 6,363,065 B1 * | 3/2002 | Thornton et al. | ............ | 370/401 |
| 6,665,293 B2 * | 12/2003 | Thornton et al. | ............ | 370/352 |
| 6,674,734 B1 * | 1/2004 | Hsu et al. | .................... | 370/401 |
| 6,791,970 B1 * | 9/2004 | Ng et al. | ..................... | 370/352 |
| 2002/0022485 A1 * | 2/2002 | Kolsky et al. | ............... | 455/452 |
| 2003/0012159 A1 * | 1/2003 | Vassilovski et al. | ......... | 370/335 |

FOREIGN PATENT DOCUMENTS

| | | |
|---|---|---|
| EP | 1 276 298 | 1/2003 |
| WO | WO 99/12365 * | 3/1999 ............ F04Q 7/22 |
| WO | WO 9912365 A1 * | 3/1999 ............ H04Q 7/22 |
| WO | WO0070893 A1 * | 5/2000 ............ H04Q 7/22 |
| WO | WO 00/70893 | 11/2000 |
| WO | WO 02/25974 | 3/2002 |
| WO | WO 02/37761 | 5/2002 |

OTHER PUBLICATIONS

"3rd Generation Partnership Project: Technical Specification Group Services and System Aspects; IP Multimedia (IM) Subsystem—Stage 2" 3GPP TS 23.228 V5.1.0 (Jun. 2001).

* cited by examiner

Primary Examiner—Sonny Trinh
Assistant Examiner—Thai N. Vu
(74) Attorney, Agent, or Firm—Morrison & Foerster LLP

(57) ABSTRACT

The invention relates to a method for causing a communication link to be established between a mobile communication terminal of a mobile radio network and a partner communication terminal of a communication network operating in accordance with the Internet Protocol. The mobile communication terminal is associated with a directory number of the mobile radio network and the partner communication terminal is associated with an IP address of the communication network. To cause a communication to be established between the mobile communication terminal and the partner communication terminal, a text message, sent out by the mobile communication terminal and containing the IP address, is received by a service node connected to the mobile radio network, and the service node sends a task message including the directory number and the IP address to the communication network. Thereupon, the communication link KV is established between the mobile communication terminal and the partner communication terminal.

9 Claims, 3 Drawing Sheets

METHOD FOR CAUSING A COMMUNICATION LINK TO BE ESTABLISHED

CLAIM FOR PRIORITY

This application claims priority to Application No. 10203199.1 which was filed in the German language on Jan. 21, 2002.

TECHNICAL FIELD OF THE INVENTION

The invention relates to a method for causing a communication link to be established between a mobile communication terminal of a mobile radio network and a partner communication terminal of a communication network operating in accordance with the Internet Protocol.

BACKGROUND OF THE INVENTION

In the field of telecommunications, various types of communication networks are known. These include, on the one hand, communication networks which are based on the common channel signaling system No. 7 (CCS7) and are occasionally called "traditional" networks. They include public switched telephone networks (PSTN) and public land mobile networks (PLMN). In the past, voice-based communication was primarily conducted via these "traditional" networks. In these networks, the subscribers are addressed via telephone directory numbers which are also called E.164 numbers. On the other hand, networks are also known which are based on the Internet Protocol (IP). Voice transmission over such IP networks, which is called "Voice over IP" (VoiP) is becoming more and more widespread. In these networks, the subscribers are addressed via addresses which conform to the Internet Protocol; this includes Internet addresses and E-mail addresses.

A subscriber to a "traditional" network cannot easily set up a voice link to a subscriber of an Internet Protocol-based network (IP network) because addresses conforming to the IP (IP addresses) cannot be processed in the "traditional" networks.

SUMMARY OF THE INVENTION

In one embodiment of the invention, there is a method in which a voice communication link between a subscriber of a mobile telephone network and a subscriber of an IP communication network can be set up on the initiative of the subscriber of the mobile telephone network.

According to one embodiment of the invention, there is also a method for causing a communication link to be established between a mobile communication terminal of a mobile radio network and a partner communication terminal of a communication network operating in accordance with the Internet Protocol (IP), the mobile communication terminal being associated with a directory number of the mobile radio network and the partner communication terminal being associated with an IP address of the communication network, in which a text message, sent out by the mobile communication terminal and containing the IP address, is received by a service node connected to the mobile radio network, and the service node sends a task message containing the directory number and the IP address to the communication network, as a result of which the communication network is caused to establish the communication link between the mobile communication terminal and the partner communication terminal.

In this arrangement, the directory number of the mobile radio network is the E.164 number which can be usually input at mobile telephones; the IP address of the communication network is understood to be an address which, in communication networks operating in accordance with the Internet Protocol (IP), is used for addressing subscribers. Such an IP address can be, for example, Internet addresses known from the World Wide Web (WWW) or also E-mail addresses known from the field of E-mail communication.

In the invention, it is particularly advantageous that the IP address is transmitted to the service node in text form (e.g. as a text string within the text message). This makes it possible also to transmit within the mobile radio network those addresses which are not recognized as addresses in this mobile radio network and cannot be used as such. The IP address is virtually transported as text in the mobile radio network without the mobile switching centers recognizing that the text represents an address.

In another embodiment of the invention, the communication network is caused to establish the communication link in that the service node finds a gatekeeper of the communication network on the basis of the IP address, the service node sends the task message to this gatekeeper, as a result of which the gatekeeper is ordered to find the partner communication terminal associated with the IP address, a media gateway connecting the mobile radio network and the partner communication network, and cause the media gateway to establish the communication link. In this arrangement, it is particularly advantageous that the gatekeeper of the communication network is ordered to set up the communication link between the mobile communication terminal of the mobile radio network and the partner communication terminal of the communication network. The gatekeeper is able to do this because, as a unit of the communication network (in contrast to units of the mobile radio network), it can process both IP addresses and mobile radio directory numbers for addressing.

In another embodiment according to the invention, the text message can also include the directory number in addition to the IP address. In this context, it is advantageous that both the IP address and the directory number can be transmitted to the service node connected to the mobile radio network by means of a single text message and the service node, after receiving this message, has both the IP address needed and with the directory number.

However, the method can also be embodied in such a manner that the directory number is read out of a data memory of the mobile radio network by the service node by using sender data contained in the text message. In this embodiment, the directory number advantageously does not need to be transmitted to the mobile radio network at all and, instead, the directory number is read out of a data memory of the mobile radio network.

In still another embodiment according to the invention, a written short message (SMS) can be used as the text message. In this arrangement, the familiar short message system (SMS) is advantageously used for transmitting the text message to the service node. Using this familiar system for a new function provides for a particularly simple, uncomplicated and inexpensive implementation of the method according to the invention.

The method can be implemented in such a manner that the short message sent out by the mobile communication terminal arrives at a short message service center of the mobile radio network and this short message service center forwards the short message to the service node on the basis of the presence of the IP address in the short message. In this arrangement, the facilities likewise already existing in the mobile radio network—e.g. the short message service center—are advantageously used for transporting the text message.

However, the method according to the invention can also be embodied in such a manner that a character string called a "USSD string" is used as the text message.

This can be implemented in such a manner that the character string sent out by the mobile communication terminal arrives at a mobile switching center of the mobile radio network and this mobile switching center forwards the character string to the service node on the basis of a USSD identifier (e.g. a USSD service code) of the character string. In the two aforementioned embodiments, it is particularly advantageous that the familiar system of USSD string transmission is used for transmitting the text message to the service node. This makes it possible in a simple and inexpensive manner to send the text message to the service node by means of a data transmission mechanism which is known per se.

In one embodiment of the method according to the invention, a page message of a WAP service can be used as the text message.

This can be embodied in such a manner that the page message sent out by the mobile communication terminal arrives at a WAP server of the communication network and thereupon this WAP server sends the task message. When a WAP page message is used as the text message, the IP address, and possibly also the directory number, can be input in a particularly convenient manner on pages of the mobile communication terminal. For example, the directory number and the IP address can be input into an input mask which is generated by the WAP page on a display unit of the mobile communication terminal.

BRIEF DESCRIPTION OF THE DRAWINGS

The figures provide a further explanation of the embodiments of the invention In the figures.

DETAILED DESCRIPTION OF THE INVENTION

Figure 1:
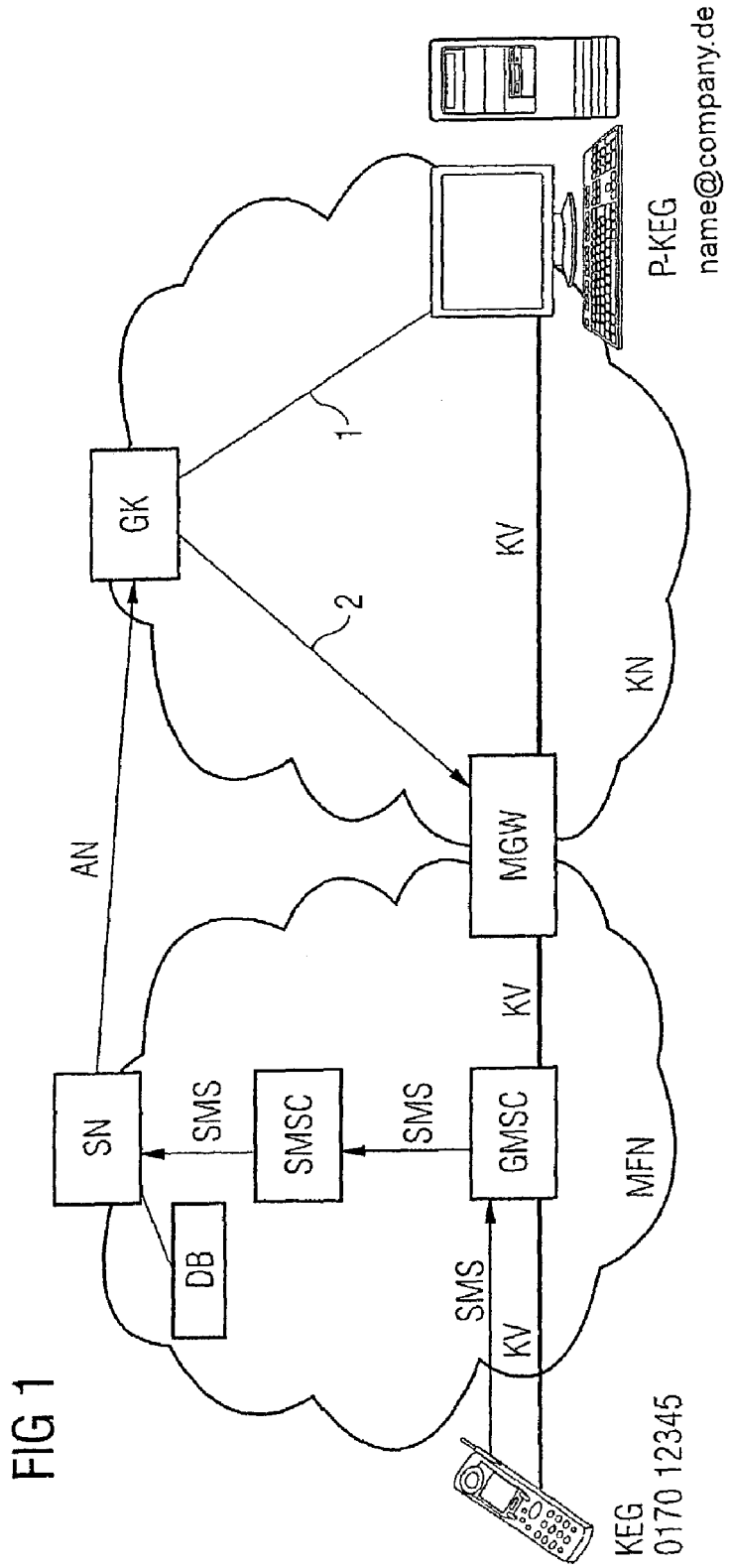
FIG. 1 shows an exemplary embodiment in which a short message is transmitted as the text message.

In FIG. 1, a mobile radio network MFN is diagrammatically shown on the left side, which can be a second-generation mobile radio network (e.g. a GSM network). A user of this mobile radio network MFN has a mobile communication terminal KEG which is associated with a mobile radio number (0170 12345). This mobile radio number is used for addressing the mobile communication terminal KEG in the mobile radio network MFN.

On the right side of FIG. 1, a communication network KN is shown which operates on the basis of the Internet Protocol (IP). The communication network KN can be, for example, a so-called IP network which is also called an H.323 network. In particular, this can be the Internet, the "World Wide Web" as part of the Internet or an in-house Intranet. A partner communication terminal P-KEG in the form of a computer is connected to the communication network KN.

This partner communication terminal P-KEG is associated with an IP address which can have the form, for example, of the E-mail address "name@company.de". Thus, the IP address represents an alphanumeric character string and is used for addressing the computer or a user of the computer in the communication network KN. The communication network KN is connected to the mobile radio network MFN by means of a media gateway MGW (media gateway).

When a user of the communication terminal KEG wishes to establish a communication link to the partner communication terminal P-KEG (or to a user of this partner communication terminal), it generates a text message in the form of an SMS message SMS which contains the IP address of the partner communication terminal or, respectively, of the user of this partner communication terminal, and its own directory number (that is to say that of the mobile communication terminal KEG). This written short message SMS is sent in familiar manner to a short message service center (SMSC), e.g. via a mobile switching center GMSC (media gateway mobile switching center). The short message service center SMSC recognizes, e.g. from the content of the short message (for example from the presence of the IP address) or from a recognition symbol sent along with the short message that a communication link to a partner communication terminal is to be established from the mobile communication terminal. The short message service center SMSC thereupon forwards the short message SMS to a service node (SN) which causes the establishment of communication links as a service. Such a service node SN can be, for example, a service control point (SCP) if the mobile radio network has the structure of an intelligent network (IN). However, the service node SN can also be, for example, a service node called a "parlay client" which is connected to the mobile radio network MFN by using the parlay technique known per se. After receiving the short message SMS, the service node SN has both the IP address of the partner communication terminal P-KEG and also the directory number of the mobile communication terminal KEG. The service node SN thereupon sends a task message AN, containing the directory number of the mobile communication terminal and the IP address of the partner communication terminal, to a gatekeeper GK of the communication network. With this task message AN, the gatekeeper GK is ordered to set up a link between the partner communication terminal P-KEG of the communication network KN and the mobile communication terminal KEG of the mobile radio network MFN. For this purpose, the gatekeeper GK looks for the partner communication terminal P-KEG (arrow 1) with the aid of the IP address. Owing to the presence of the IP address and of the directory number of the mobile communication terminal, the gatekeeper GK knows that a link between the communication network KN and the mobile radio network MFN is to be established. The gatekeeper GK therefore looks for a media gateway MGW connecting these two networks and causes (arrow 2) this media gateway MGW to set up a communication link KV (for example a voice link) between the partner communication terminal P-KEG and the mobile communication terminal KEG. This media gateway MGW thereupon establishes this communication link KV; thus, the communication link KV is established between the communication terminal KEG of the mobile radio network MFN and the partner communication terminal P-KEG of the communication network KN. This communication link KV does not necessarily need to extend via the mobile switching center GMSC; similarly, other mobile switching centers, not shown in the figure, can be involved in the setting up of the communication link KV For example, a voice communication between a user of the mobile communication terminal KEG and a user of the partner communication terminal P-KEG can be carried out via this communication link KV. The communication link then represents a so-called voice channel.

An alternative exemplary embodiment can also be embodied in such a manner that the IP address of the partner communication terminal is transmitted to the service node by means of the text message SMS. On the basis of the sender data/sender information also transmitted with the text message SMS, the service node SN thereupon finds the directory number of the mobile communication terminal from a database DB included in the mobile radio network MFN. Thus, the service node is also provided with both the IP address of the partner communication terminal and the directory number of the mobile communication terminal in this alternative solution.

Figure 2:
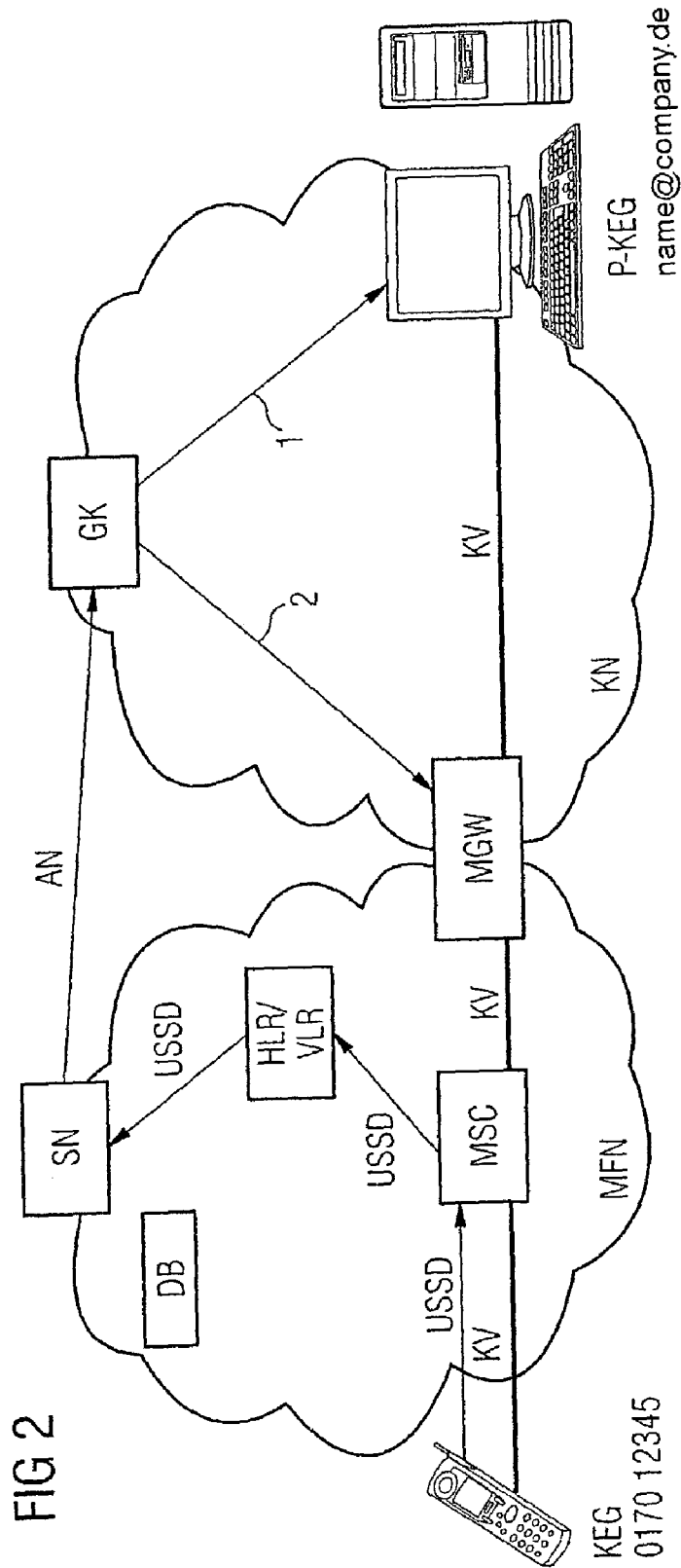
FIG. 2 shows an exemplary embodiment in which a USSD string is transmitted as the text message.

FIG. 2 again shows the mobile radio network MFN and the communication network KN, already known from FIG. 1, the mobile radio network MFN in this exemplary embodiment partly using different units than in the exemplary embodiment according to FIG. 1.

Deviating from the exemplary embodiment shown by means of FIG. 1, a "USSD string" USSD, which contains the IP address of the partner communication terminal P-KEG, is generated as text message by the mobile communication terminal KEG in this exemplary embodiment. Such a USSD string represents a character string (a sequence of text characters) and, for example, can have the following structure "*123#name@company.de#". The first part "*123#" of this USSD string represents a so-called USSD service code. This USSD service code specifies what to do with the remaining data of the USSD string (that is to say, with the IP address in this case). For this purpose, the information that a USSD string with the USSD service code "*123#" is to be sent to the service node SN is stored in a memory unit of the mobile radio network (for example in the home location register (HLR)). This information is known by the name "camel subscription".

The mobile communication terminal KEG then sends the USSD string to a mobile switching center (MSC). The mobile switching center MSC then forwards the USSD string to the service node SN by utilizing the data existing in the home location register HLR and by utilizing the visitor location register VLR. The service node SN can then read the directory number of the communication terminal from the database DB (analogously to the exemplary embodiment described in conjunction with FIG. 1) or, as an alternative, this directory number can also be delivered together with the USSD string. The service node SN then has both the directory number of the communication terminal KEG and the IP address of the partner communication terminal P-KEG. The further sequence of the method corresponds to the sequence explained in conjunction with FIG. 1.

Figure 3:
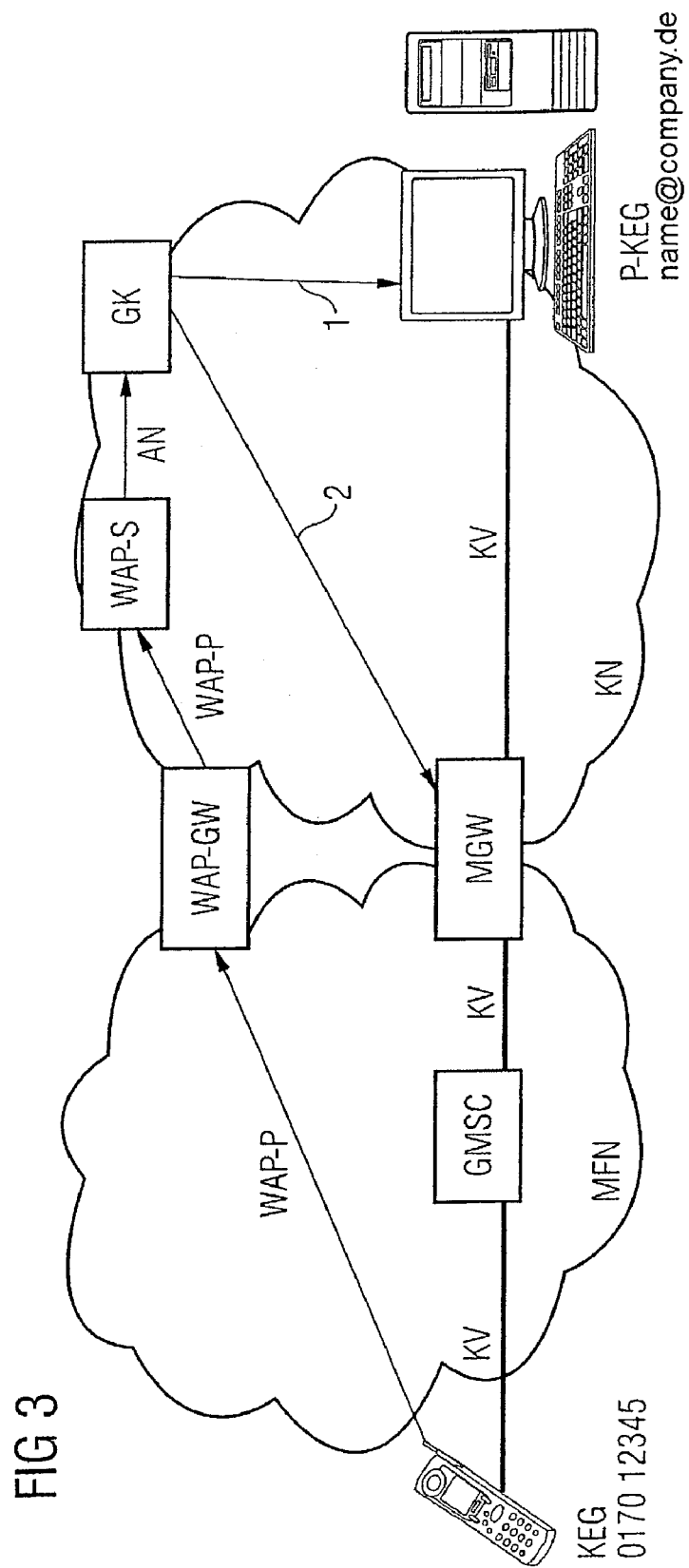
FIG. 3 shows an exemplary embodiment in which a WAP page is transmitted as the text message.

In FIG. 3, an exemplary embodiment is shown in which a page message (WAP page) of a WAP service is used as text message. This WAP page is requested in familiar manner by the mobile communication terminal KEG from a WAP server and transmitted by the latter to the mobile communication terminal KEG; this is not shown in FIG. 3. The WAP page is displayed on a display unit of the communication terminal KEG. The WAP page can contain, for example, an input mask into which a user of the communication terminal KEG enters the IP address of the partner communication terminal and his own directory number (namely that of the communication terminal). The page message WAP-P is thereupon sent to the WAP server WAP-S. Since the WAP server WAP-S is resident in the communication network KN operating in accordance with the Internet Protocol in this exemplary embodiment, the page message WAP-P is sent via a WAP media gateway (WAP-GW) which connects the mobile radio network MFN and the communication network KN. This WAP media gateway WAP-GW thereupon forwards the page message WAP-P to the WAP server WAP-S. In this exemplary embodiment, the WAP server WAP-S operates as service node SN and sends the task message AN containing the directory number and the IP address to the gatekeeper GK of the communication network. The further sequence of the method corresponds to the sequence already described. It should be pointed out here that the WAP server WAP-S can also be located outside the communication network KN and only be connected to the latter. In this case, the WAP media gateway WAP-GW would connect the mobile radio network MFN directly to the WAP server WAP-S.

The invention relates to a method by means of which, on request by a subscriber to the mobile radio network, who has a mobile communication terminal of the mobile radio network, a communication link (e.g. a voice communication link) is set up between the mobile communication terminal and a partner communication terminal in a further communication network. This is also possible if mobile radio directory numbers (e.g. E.164 numbers) are used in the mobile radio network and IP addresses are used in the communication network for addressing the terminals or the users of these terminals, respectively. To set up the communication link, the mobile communication terminal transmits the IP address of the partner communication terminal to a gatekeeper of the communication network in the form of a text message; the communication network thereupon sets up the communication link between the partner communication terminal and the mobile communication terminal.

What is claimed is:

1. A method for establishing a communication link between a mobile communication terminal of a mobile radio network and a partner communication terminal of a communication network operating in accordance with an Internet Protocol, the mobile communication terminal being associated with a directory number of the mobile radio network and the partner communication terminal being associated with an IP address of the communication network, comprising:
  sending a text message, via the mobile communication terminal, including the Internet Protocol address, which is received by a service node connected to the mobile radio network; and
  sending a task message, via the service node, including the directory number and the Internet Protocol address to the communication network, such that the communication network establishes the communication link between the mobile communication terminal and the partner communication terminal, wherein
  the communication network establishes the communication link by:
  finding a gatekeeper, using the service node, of the communication network on the basis of the Internet Protocol address, and
  sending the task message, via the service node, to the gatekeeper, such that the gatekeeper is ordered to find the partner communication terminal associated with the IP address, and find a media gateway connecting the mobile radio network and the communication network, and causes the media gateway to establish the communication link.

2. The method as claimed in claim 1, wherein the text message includes the directory number in addition to the Internet Protocol address.

3. The method as claimed in claim 1, wherein the directory number is read out of a data memory of the mobile radio network by the service node by using sender data included in the text message.

4. The method as claimed in claim 1, wherein a written short message is used as the text message.

5. The method as claimed in claim 4, wherein the short message sent out by the mobile communication terminal arrives at a short message service center of the mobile radio network and the short message service center forwards the short message to the service node on the basis of the presence of the Internet Protocol address in the short message.

6. The method as claimed in claim 1, wherein a character string is used as the text message.

7. The method as claimed in claim 6, wherein the character string sent out by the mobile communication terminal arrives at a mobile switching center of the mobile radio network and the mobile switching center forwards the character string to the service node on the basis of a USSD identifier of the character string.

8. The method as claimed in claim 1, wherein a page message of a WAP service is used as the text message.

9. The method as claimed in claim 8, wherein the page message sent out by the mobile communication terminal arrives at a WAP server of the communication network and the WAP server sends the task message.

* * * * *